Dec. 14, 1965   W. F. WALKER   3,222,928
TANK GAUGE APPARATUS
Filed Jan. 24, 1962   2 Sheets-Sheet 1

INVENTOR.
WILLIAM F. WALKER
BY
Busser, Smith & Harding
ATTORNEYS

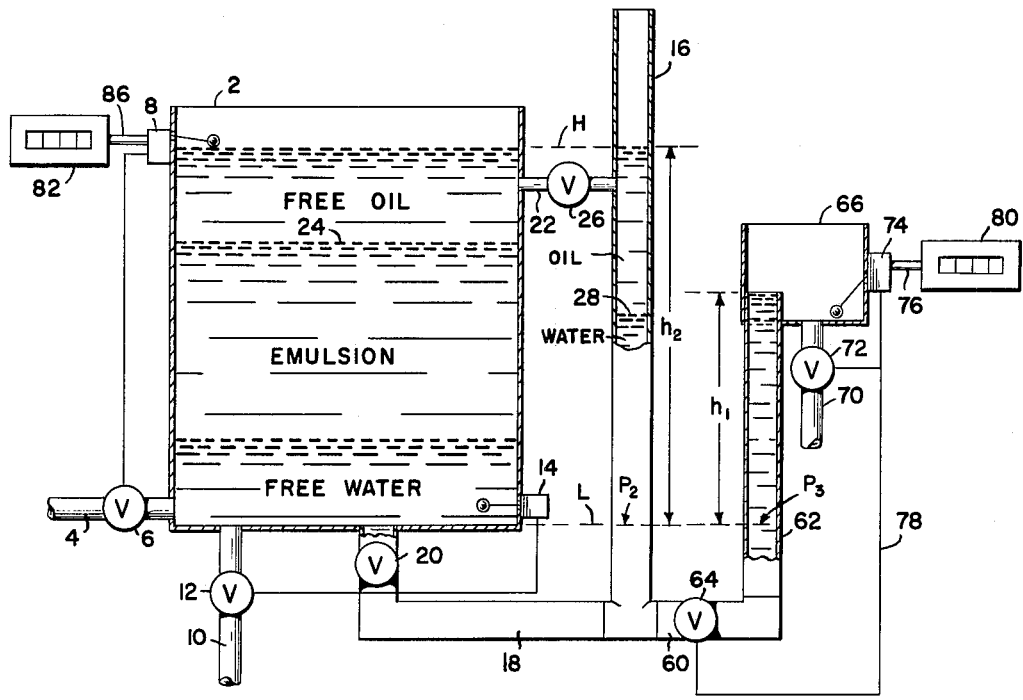

United States Patent Office 3,222,928
Patented Dec. 14, 1965

3,222,928
TANK GAUGE APPARATUS
William F. Walker, Tyler, Tex., assignor to Sun Oil Company, Philadelphia, Pa., a corporation of New Jersey
Filed Jan. 24, 1962, Ser. No. 168,353
13 Claims. (Cl. 73—224)

This invention relates to tank gauge apparatus for use in determining the amount of liquid present in a tank containing liquids of different densities. While the invention as described is particularly applicable to determining the amount of oil and water in a mixture thereof contained in a tank, it will be evident that it is also applicable to the gauging of tanks containing other liquids of different densities.

Crude oil taken from an oil well is generally in a mixture containing free oil, free water, and an emulsion thereof and this mixture is generally delivered to a tank. In the case of lease tanks which are cyclically filled and drained, production is metered in terms of the number of these cycles. It is thus desirable to know the amount of water and oil present in each filling of the tank. One method of accomplishing this result involves the use of separators which physically separate the oil and water by the use of de-emulsifiers. However, this method is time-consuming and expensive. It is the general object of this invention to provide a method and apparatus for determining the amount of oil and water in a tank containing a mixture of these liquids without any separation thereof.

The general object of the invention as well as others relating to details will become apparent from the following description read in conjunction with the accompanying drawings, in which:

FIGURE 3 is a diagrammatic sectional view of another form of apparatus in accordance with this invention; and FIGURE 4 is a fragmentary view illustrating details of the apparatus shown in FIGURE 3 in a different operating condition.

Figure 1:
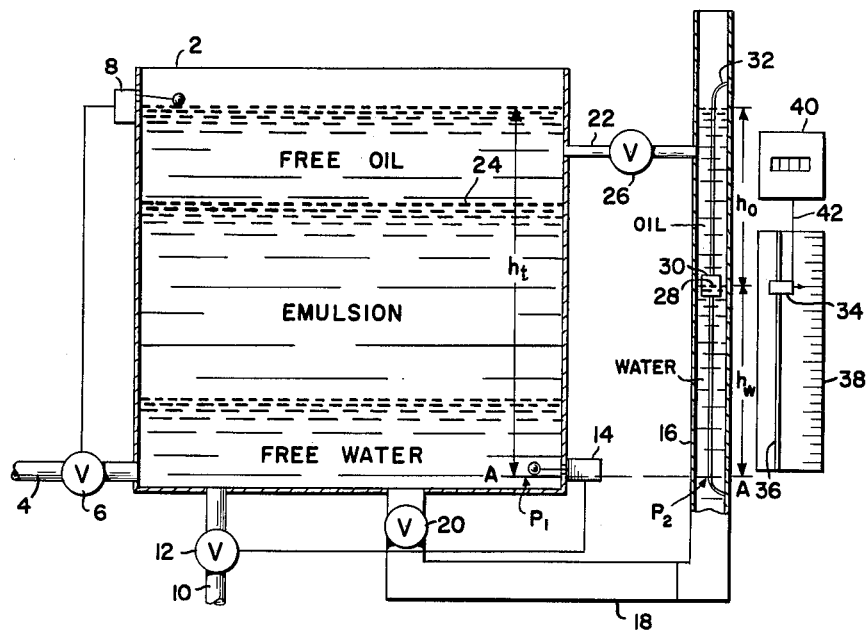
FIGURE 1 is a diagrammatic sectional view of one form of apparatus in accordance with this invention.
Figure 2:
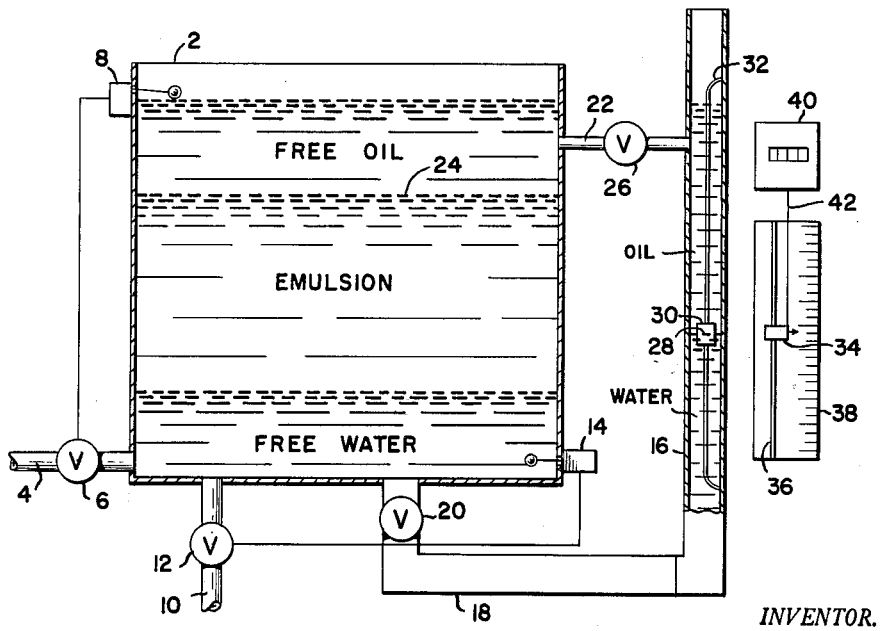
FIGURE 2 is a diagrammatic sectional view of the apparatus shown in FIGURE 1 illustrating another operative condition of the apparatus.

Referring now to FIGURES 1 and 2, there is shown therein a form of apparatus which is illustrated as applied to the determination of the quantity of oil and water in a mixture thereof contained in a tank. As shown in these figures, the mixture in the tank 2 would generally contain an upper layer of free oil, a medial layer of an emulsion of oil and water, and a bottom layer of water because of the relative densities of these liquids. The tank 2 is filled through a conduit 4 communicating with tank 2 and having a valve 6 connected therein for controlling flow therethrough. The mixture of oil and water may be pumped from a well through the conduit 4 into tank 2 during the filling operation thereof. In order to insure that the tank is filled to the same level during each filling operation there is provided a level responsive means 8 which operates in a well-known manner to control the closing of valve 6 when the level of the liquid in the tank reaches a predetermined height.

The tank 2 is drained through a conduit 10 communicating with the bottom of tank 2 and having a valve 12 connected therein for controlling flow therethrough. In order to stop the draining at a predetermined low level of liquid in the tank 2, there is provided a level responsive means 14 which is operative in a well-known manner to control the closing of valve 12 when the level of the tank reaches a predetermined low level. In the illustrated apparatus it will be assumed that the low level of the tank 2 will be at the tank bottom. However, if desired, this low level may be slightly above the tank bottom.

Valves 8 and 12 are manually operable and may, of course, be so operated in order to control the draining and filling of tank 2. However, it is desirable to control the filling and draining by means of a level responsive means since a more accurate filling and draining may be obtained. By means of the filling and draining apparatus, the tank 2 may be cyclically filled and drained with a predetermined quantity of the oil and water mixture. This cycle will be more fully described hereafter.

A gauging tube 16 extends vertically adjacent the tank 2 and is connected thereto by a conduit 18. Conduit 18 communicates with the bottom of tube 16 and with the tank 2 through the bottom thereof. A valve 20 is provided in conduit 18 to control flow therethrough. A conduit 22 provides communication between the gauging tube 16 and the tank 2 at a level above the maximum possible level of the oil-emulsion interface 24 in tank 2. Conduit 22 has a valve 26 connected therein for controlling flow therethrough.

The upper ends of the tank 2 and the tube 16 are open so that atmospheric pressure exists in the vapor spaces thereof. If a construction is desired in which the upper ends of the tank 2 and the tube 16 are closed, provision must be made to equalize the pressures in the tank 2 and the tube 16, as by interconnecting the vapor spaces of the tank 2 and the tube 16.

The tube 16 is filled with a mixture of free oil and free water to a height equal to the upper level of the liquid in the tank 2. This may be accomplished by opening the valves 20 and 26 with the tank in the filled condition whereby free oil will enter tube 16 through conduit 22 and free water will enter tube 16 through conduit 18. However, if desired, a mixture of free oil and free water may be added to tube 16 through its upper end with the valves 26 and 20 in the closed position. The mixture of oil and water in the tube 16 will form an oil-water interface indicated at 28 without intervening emulsion. In an actual construction the tube 16 would have a very small volume so that a small amount of free oil and free water is required to maintain a clean interface.

With the valves 20 and 26 open so that the liquids in the tube 16 are brought into free communication with the liquids in the tank 2, the oil-water interface 28 will move to a vertical position which would be in horizontal alignment with the position of an oil-water interface which would exist in the tank 2 with the emulsion broken so that the tank 2 contained only free oil and free water. This is in accordance with fluid statics and manometer principles and can be demonstrated by the following equations and discussion.

It will be evident that a U-tube manometer is provided by the liquid contained in tank 2, conduit 18 and tube 16. Since the pressure is constant over horizontal planes in a fluid, equal pressures exist in $P_1$ in tank 2 and at $P_2$ in tube 16 on the horizontal plane indicated by line A—A in FIGURE 1. In accordance with the principles of fluid statics, the equation representing the pressure P at the bottom of a column of liquid having a height $h$ and a weight-density D is expressed as follows:

(1) $$P = hD$$

The pressure $P_1$ may thus be expressed as follows, where $h_t$ is the height of the column of liquid in tank 2 above the plane A—A and $D_{o-w}$ is the weight-density of the combination of oil and water in tank 2:

(2) $$P_1 = h_t D_{o-w}$$

Since the pressure $P_1$ is a result of the combined effect of the pressure head provided by the water and the oil either as an emulsion or as separate columns of liquid, the pressure $P_1$ may be expressed in the following equation, wherein $f_o$ is the fraction of oil in the tank 2, $f_w$ is the fraction of water in tank 2, $D_o$ is the weight-density of the oil, and $D_w$ is the weight-density of the water:

(3) $$P_1 = h_t(f_o D_o + f_w D_w)$$

or (4) $$P_1 = (f_o h_t) D_o + (f_w h_t) D_w$$

The pressure $P_2$ may be expressed by the following equation, wherein $h_o$ is the height of the column of oil in tube 16 and $h_w$ is the height of a column of water in tube 16 above plane A—A:

(5) $$P_2 = (h_o) D_o + (h_w) D_w$$

It will be apparent that since tank 2 and tube 16 are interconnected by conduit 22, the upper level of the liquid in each will be the same whereby the following equation may be written:

(6) $$h_t = h_o + h_w$$

Also, since the sum of $f_o$ and $f_w$ is equal to one, the following equation may be written:

(7) $$h_t = (f_o + f_w =) h_t = f_o h_t + r_w h_t$$

By inspection or by algebraic solution of Equations 4, 5, 6 and 7 it is seen that:

(8) $$h_o = f_o h_t$$

(9) $$h_w = f_w h_t$$

Equations 8 and 9 thus demonstrate that the height of the columns of oil and water in tube 16 correspond to the height of the oil and water contained in tank 2 if the emulsion were broken so that the tank contained only free oil and water. Hence, the oil-water interface in tube 16 is in horizontal alignment with the theoretical oil-water interface in tank 2 with the emulsion in tank 2 broken. Thus, the oil-water interface 28 may be relied on as an accurate indication of the percent of oil and water in the tank 2.

In the above analysis it is assumed that the density of the water is greater than the density of the oil, the density of the oil will remain substantially constant, and there are no significant temperature variations. These assumptions are permissible from a practical standpoint.

Means are provided for reading the position of the oil-water interface 28. Such means comprises a float 30 positioned within the tube 16. Float 30 is made of a material having a density such that it will float in water but will not float in oil. Float 30 will thus float on the water in tube 16 at the interface 28. Float 30 is guided for vertical movement within tube 16 by a guide 32.

Suitable means are provided for indicating the position of the float 30. One form of such indicating means comprises a light-weight magnetic follower member 34 guided for free vertical movement adjacent the tube 16 by a guide member 36 magnetically coupled with a magnet, carried by the float 30, for example, by being embedded therein. Thus, as the float 30 moves vertically on guide member 32, the follower member 34 will move vertically to follow the movement of float 28. A suitable scale 38 may be provided to permit a direct reading of the position of the float 30. The scale 38 may be calibrated in terms of the percentage of oil or water in the tank 2 or in terms of the volume of water.

There may be provided a liquid level meter 40 of the type having a dial and counter arrangement which provides a visual indication of the liquid level. Meter 40 has a cable 42 connected at one end to member 34 and wound around a drum which operates the dial and counter arrangement.

Each operating cycle is begun with the filling of tank 2. At the start of the filling operation, the tank is at its low level as determined by the level responsive means 14, valves 12, 20 and 26 are in the closed position and valve 6 is open. The mixture of oil and water is delivered to tank 2 through the conduit 4 until the level responsive means 8 operates to close the valve 6 when the desired full level is reached in the tank 2. At this time the gauging tube 16 contains free oil and water in a proportion corresponding to the proportion of oil and water in the previous filling of tank 2. FIGURE 1 illustrates the condition of the apparatus at the end of the filling operation at which time valve 6 is closed.

The next step is to open the valves 20 and 26 to provide commuication between the tank liquid and the liquid in the gauging tube 16. The oil-water interface 28 will then shift from the position shown in FIGURE 1 to the position shown in FIGURE 2 to indicate the percentage of oil and water presently in the tank 2. There is a downward shift of the interface 28 which is indicative of the fact that in the previous filling of tank 2 there was a greater percentage of water than in the tank filling now being measured. It will be evident that the greater the percentage of water in the tank 2, the greater will be the height of the oil-water interface 28 in tube 16.

It will be noted that by reason of the connection of conduit 22 with the tank 2 at a level above the maximum possible oil-emulsion interface 24 in the tank 2 only oil can be transferred between the tank 2 and the tube 16 through conduit 22. Also, since tube 16 is connected to the bottom of the tank 2 by conduit 18, only water may pass into tube 16 through conduit 18. Thus, tube 16 will at all times contain only free oil and free water and will never contain any emulsion thereof. Since tube 16 has a relatively small volume, the flow of oil or water between tube 16 and tank 2 will not affect the percent of oil and water in tank 2.

As was discussed above, the oil-water interface 28 in tube 16 will move to a level which would be in horizontal alignment with the theoretical oil-water interface in the tank 2 with the emulsion therein being broken and the mixture therein containing only free oil and water. Hence, the oil-water interface 28 may be relied on as an accurate indication of the percentage of oil and water in the tank 2. The scale 38 is now read by observing the position of the magnetic follower 34. The scale 38 will provide a reading of the percent of oil and water present in the tank 2. Also, the meter 40 provides a reading of the liquid level.

The final step in the cycle of operation is the draining of the tank 2. To effect draining, valves 20 and 26 are closed and valve 12 is open to permit passage of the liquid through conduit 10. The draining is terminated at a predetermined low level by the closure of valve 12 in response to the controlling action of the level responsive means 14. The tank 2 is now prepared for another filling operation.

Referring to FIGURES 3 and 4, there is shown therein another form of apparatus which is illustrated as applied to the determination of the amount of oil and water in a mixture thereof contained in a tank. This apparatus permits the deterimnation of the amount of water and oil in the tank without the actual location of the oil-water interface in the gauging tube. The filling and draining means in the apparatus shown in FIGURE 3 is identical with the filling and draining means described with respect to the apparatus shown in FIGURES 1 and 2 and parts corresponding to parts hereinbefore described are given like reference numerals. The inlet flow is provided by conduit 4 under the control of valve 6 and level responsive means 8. The outlet flow is provided by conduit 10 under the control of valve 12 and level responsive means 14.

A gauging tube 16 extends vertically adjacent the tank 2 and is connected thereto by a conduit 18 and a conduit 22 in the manner described with respect to the apparatus shown in FIGURES 1 and 2. The flow through conduits 18 and 22 is controlled by valves 20 and 26, respectively. Means are provided for determining the percentage of water in the mixture of oil and water in the cyclically filled tank 2 without actually locating the oil-water interface in the tube 16. Such means comprises a conduit 60 connected to the bottom end of the tube 16 and to a vertically extending tube 62. Conduit 60 has a valve 64 therein for controlling the flow therethrough. The upper end of the tube 62 projects into a vessel 66 so that any overflow through the upper end of tube 62 will be accumulated in the vessel 66.

The tops of the tank 2, the tube 16 and the vessel 66 are open so that atmospheric pressure exists in the vapor spaces thereof. If a construction is desired in which the tank 2, the tube 16 and the vessel 66 are enclosed, provision must be made to equalize the pressures therein by suitable interconnecting tubing.

The tube 62 is constructed so that it extends a vertical distance $h_1$ (see FIGURE 3) above the lower level of the tank 2, indicated at L in FIGURE 3, so that a pressure head of water in tube 62 will be equal to a pressure head of oil extending a vertical distance $h_2$ (see FIGURE 3) in tube 16. The vertical distance $h_2$ is equal to the height of the filled upper level of the liquid in tank 2 and tube 16, indicated at H in FIGURE 3, above the lower level L. Thus, if the oil-water interface 28 in column 16 were at the level of the lower level L with valves 20 and 26 closed and valve 64 was opened, the liquid in the U-shaped tube comprising tube 16, conduit 60 and tube 62 would be in perfect balance and there would be no movement of the fluids therein and hence no overflow into vessel 66. However, it will be apparent that if the oil-water interface 28 in the tube 16 were at any height above the level L when the valve 64 was opened, a quantity of water will spill over from tube 62 into the vessel 66. Moreover, this quantity of overflow water will be in proportion to the height of the oil-water interface 28 in the tube 16. The overflow occurs because the head provided by a mixture of oil and water in tube 16 extending the length $h_2$ is greater than the head provided by the water in tube 62 extending the length $h_1$. Thus, if the interface 28 were positioned in accordance with the procedures indicated above with respect to FIGURES 1 and 2, and was, therefore, indicative of the percent of oil and water in the tank 2, the overflow into the vessel 66 would be in proportion to the quantity of water in the tank 2.

This relationship can be demonstrated mathematically by the following equations and discussion. After valve 64 is opened, the pressure at $P_2$ will be equal to the pressure at $P_3$ (FIGURE 3) at the level indicated at L in tubes 16 and 62, respectively.

The following equations may be written based on the construction of the apparatus as discussed above:

(10) $\qquad P_2 = h_2 D_o$

(11) $\qquad P_3 = h_1 D_w$

The relationship of the heights of the columns of liquid may be expressed as follows, wherein $h_o$ and $h_w$ represent the heights of the columns of oil and water, respectively, in the tube 16 after a testing measurement of tank 2 has been made and before the valve 64 is opened to permit overflow into vessel 66:

(12) $\qquad h_2 = h_o + h_w$

If $h_x$ represents the height of a column in tube 62 that would spill over upon the opening of valve 64, the following equation may be written representing the pressure at $P_2$ for a given measurement of the quantity of oil and water in a particular filling of tank 2:

(13) $\qquad P_2 = h_o D_o + (h_w - h_x) D_w$

It is noted that in Equation 13, $(h_w - h_x)$ represents the height of water in tube 16 after there has been a drop in the level of the liquid in tube 16 as a result of spill over into vessel 66.

Combining Equations 10 and 13 and rearranging terms, we arrive at the following equations:

(14) $\qquad h_2 D_o = h_o D_o + h_w D_w - h_x D_w$

(15) $\qquad h_x D_w = h_o D_o - h_2 D_o + h_w D_w$

(16) $\qquad h_x D_w = (h_o - h_2) D_o + h_w D_w$

By substituting Equation 12 in Equation 16 and solving for $h_x$ we arrived at the following equations:

(17) $\qquad h_x D_w = (-h_w) D_o + h_w D_w$

(18) $\qquad h_x = \dfrac{h_w}{D_w}(D_w - D_o)$

From Equation 18 it can be seen that $h_x$, the height of the overflow is directly proportional to $h_w$ the height of the water in tube 16 before an overflow measurement. Moreover, since $h_w$ is an indication of the percentage of water in tank 2 as was discussed previously and since $h_w$ also represents the height of the interface 28, it follows that the overflow in the vessel 66 is proportional to the quantity of water in the tank 2 for a given measurement cycle.

Vessel 66 is drained through a conduit 70 communicating with the bottom thereof and containing a valve 72 therein for controlling the flow therethrough. The drain valve 72 is controlled by a level responsive means 74. The level responsive means 74 is of any well-known type which is operative to close the valve 72 at a predetermined low level in the vessel 66 and to open the valve 72 at a predetermined full level in the vessel 66.

The level responsive means 74 is set to open the valve 72 when the upper level in the vessel 66 is such that the accumulated overflow volume in the vessel 66 is equal to the volume of a column of liquid in the tube 16 for a height $h_2$ minus $h_1$. This volume will be equivalent to a full tank of water in the tank 2. Thus, the vessel 66 is emptied each time a quantity of water equal to the volume of a filled tank 2 has passed through tank 2 during the repeated cycles of filling and draining. Level responsive means 74 is of a well-known type adapted to provide a pressure signal through a conduit 76 which is connected to a counter 80 which is operative to receive a pressure signal and register a count for each signal. The level responsive means 74 is also operative to send an override signal to valve 64 to close the same during the draining of vessel 66. Level responsive means 8 is also connected to a counter 82 adapted to receive a pressure signal from the level responsive means 8 each time the tank 2 is filled and drained. When the float of the level responsive means 8 drops from the full level as the tank 2 is drained, a pressure signal is sent to counter 82 through a conduit 86. The counters 82 and 80 thus maintain a record the number of times the tank 2 and the vessel 66, respectively, are filled and drained. Thus, by comparing the number of times the tank 2 and the vessel 66 are filled and drained, the amount of water which has passed through the tank 2 during the repeated cycles of filling and draining may be determined.

It will be apparent that an overflow volume in vessel 66 equal to the volume of a column of liquid in the tube 16 for a distance equal to $h_2$ minus $h_1$ is proportional to a full tank of water in tank 2 if a hypothetical operating cycle is considered. Assume, for purpose of illustration, that the tank 2 is filled with water to the upper level and that the valves 20 and 26 were subsequently opened to fill the tube 16 with water to the level H. When the valves 20 and 26 are closed and the valve 64 is subsequently opened, the water in the tube 16 will drop a vertical distance equal to $h_2$ minus $h_1$. This drop in volume in tube 16 will spill over into the vessel 66. Hence, the vessel 66 will receive a quantity of water equal to a column of liquid in the tube 16 having a height equal to $h_2$ minus $h_1$, this amount of water being representative of a tank full of water in the tank 2.

Since a drop of the upper level in the tube 16 to a height below the location at which the conduit 22 communicates with the tube 16 will permit the oil contained in the conduit 22 adjacent the tube 16 to flow into the tube 16 and thus increase the amount of overflow into the vessel 66 above an amount providing a true measurement, conduit 22 is constructed with a diameter much smaller than the diameter of tube 16. Thus, if there is any flow of oil into the tube 16 from conduit 22 during an overflow measurement, it will be a negligible amount. This type of mix measurement may also be avoided by positioning the valve 26 immediately adjacent the inlet to the tube 16 from conduit 22 or by connecting conduit 22 to the tube 16 at a level which is below the level to which the liquid in tube 16 would normally drop during an overflow measurement.

Each operating cycle of the apparatus shown in FIGURE 3 is begun with the filling of tank 2. At the start of the filling operation, the tank 2 is at its low level as determined by the level responsive means 14, valves 12, 20 and 26 are in closed position and the valve 6 is open. The mixture of oil and water is delivered to tank 2 through conduit 4 until the level responsive means 8 operates to close the valve 6 when the desired full level is reached in the tank 2.

The next step is the opening of the valves 20 and 26 to provide communication between the tank liquid and the liquid in the gauging tube 16. The oil and water in the tube 16 will now settle to a position in which the oil-water interface 28 is indicative of the proportions of oil and water in the tank 2, as previously explained, the upper level being the same as the upper level of the liquid in the tank 2. The height of the oil-water interface 28 will be higher as the percentage of water in the tank 2 is greater. During this period of liquid balancing, the valve 64 has been closed.

The valve 64 is then opened to permit the column of oil and water contained in the tube 16 to balance with the column of water in the tube 62. If there was any water in the filled tank 2, the interface 28 will be above the level L and there will be an overflow into the vessel 66 from tube 62 in proportion to the amount of water in the tank 2. The higher the position of the interface 28 the greater will be the amount of overflow into the vessel 66.

FIGURE 3 illustrates the positions of the liquids in the tubes 16 and 62 before the valve 64 is opened and after valves 20 and 26 have been closed subsequent to permitting the interface 28 to adjust to a position indicative of the amount of water in tank 2. FIGURE 4 illustrates the position of the liquids in the columns after the valve 64 has been opened. It will be noted that the upper level of the column in tube 16 has dropped from the level H. Thus, the overflow into the vessel 66 will be equal to the volume of a column in tube 16 having a height equal to the drop of the upper level in tube 16. Thus, assuming that the vessel 66 was empty before the valve 64 was opened, the volume of liquid indicated at 90 (the decrease of liquid in tube 16) will be equal to the volume of accumulated water in vessel 66, indicated at 92.

The final step in the cycle of operation is the draining of tank 2. To effect draining the valve 12 is opened while the valves 20 and 26 are closed. The draining of tank 2 may take place during or after the overflow accumulation step. Shortly after the commencement of draining, the level responsive means 8 is operative to provide a signal to counter 32 which records the filling and draining of tank 2. The draining is terminated at a predetermined low level by the closure of valve 12 in response to the controlling action of the level responsive means 14. The tank 2 is now prepared for a subsequent filling operation.

The filling and draining cycle previously described is continuously repeated. During these cycles the overflow into vessel 66 will be accumulated. When a volume of water is accumulated in the vessel 66 which is proportional to a full tank 2 of water, the level responsive means 74 will be operative to open valve 72 and to send an override signal to valve 64 through a connection 78 to insure that valve 64 is closed during the draining of vessel 66. The vessel 66 is drained to the predetermined low level at which time the level responsive means 74 operates to close the valve 72 and to send a signal to valve 64 permitting the valve 64 to open. When the vessel 66 is filled to the predetermined level, the level responsive means 74 is also operative to send a signal to the counter 80 which records the filling and draining of the vessel 66.

For the reasons discussed above, the amount of water being accumulated volumetrically in vessel 66 is directly proportional to the amount of water in the fillings of the tank 2 and by comparison of the number of fillings and drainings of the vessel 66 with the number of fillings and drainings of the tank 2 the amount of water which has passed through the tank 2 may be readily determined.

For example, if the tank 2 were filled with one barrel of liquid in each cycle and if the vessel 66 were filled to the predetermined level 100 times during repeated cycles in which the tank 2 were filled to its predetermined level 1000 times, ten percent of the oil-water mixture which passed through the tank 2 was water, namely, ten barrels of water.

It will be obvious that various changes may be made in details of construction without departing from the invention as defined by the following claims.

What is claimed is:

1. Gauging means for a tank comprising means for filling the tank from a predetermined low level to a full level with a mixture of oil and water which settles in the tank in layers of free oil, emulsion and free water, a vertically extending tube, first and second passageway means for fluid flow between the tank and said tube, said first passageway means communicating with the layer of oil in the tank and with an upper portion of said tube, said second passageway means communicating with the layer of water in the tank and with a lower portion of said tube, a second vertically extending tube, the height of said second tube above the lower level in the tank being such that the pressure head provided by a column of water in said second tube extending said height above said lower level will balance the pressure head provided by a column of oil extending a vertical distance equal to the height of the tank full level above the tank low level, third passageway means for fluid flow between said second tube and said first-named tube, means for closing said third passageway means to prevent flow therethrough, said third passageway means communicating with said first and second tubes at a level below said tank low level, and means for accumulating overflow from said second tube.

2. Apparatus as claimed in claim 1 including means for selectively controlling flow through said first, second and third passageways.

3. Apparatus as claimed in claim 1 including means for draining the filled tank and means for draining said overflow accumulating means in response to an accumulation of a volume of liquid equal to the volume of a column of liquid in said first tube having a length equal to the difference between the height of said upper level in said filled tank and the upper end of said second tube.

4. Gauging means as claimed in claim 3 including means for draining the filled tank and means for draining said overflow accumulating means in response to an accumulation of the volume of liquid equal to the volume of a column of liquid in said first tube having a length equal to the difference between the height of said upper level in said filled tank and the upper end of said second tube.

5. Apparatus as claimed in claim 4 including means for recording successive fillings of said tank and means for recording successive fillings of said overflow accumulating means.

6. The method of gauging a tank comprising the sequential steps of filling the tank from a predetermined low level to a predetermined full level with a mixture of oil and water which settles in the tank in layers of free oil, emulsion and free water, providing fluid flow communication between the tank oil layer in the tank and the upper portion of a vertically extending tube comprising free oil and free water in separated layers and between the tank water layer and the lower portion of said vertically extending tube, closing said fluid flow communication between the tank and said tube, connecting the water layer in said first-named tube with a second vertically extending tube filled with water, the height of said second tube above said low level in the tank being such that the pressure head provided by a column of water in said second tube extending said height above said lower level will balance the pressure head provided by a column of oil extending a vertical distance equal to the height of the tank full level above the tank low level, whereby if the water-oil interface in said first-named tube is above said low level, a quantity of water will overflow from said second-named tube, and accumulating the overflow from said second tube.

7. The method according to claim 6 including the steps of draining said tank and successively repeating said prior mentioned steps of filling the tank, providing fluid flow communication between the tank and said tube, closing said communication, connecting said first-named tube with said second-named tube, accumulating said overflow and draining said tank, and draining said accumulated overflow each time there is accumulated a volume equal to the volume of the column of liquid in said first tube having a length equal to the difference between the height of the upper level of said filled tank and the upper end of said second tube.

8. The method according to claim 7 comprising the steps of recording the number of fillings and drainings of said tank and of said overflow accumulations.

9. The method of gauging the proportion of oil and water in a tank which is filled repeatedly with a mixture of oil and water which may settle in the tank in layers of free oil, an emulsion of oil and water and free water comprising a cycle of operation including the sequential steps of filling the tank to a predetermined level with the mixture of oil and water to be gauged, connecting to the tank a vertically extending tube containing a gauging liquid therein, said connection providing fluid communication between the lower end of the tube and the tank at a level so that the gauging liquid is responsive to the pressure head of the water in said tank whereby the pressure head condition of the gauging liquid is indicative of the proportion of oil and water in the tank, sensing said condition of said gauging liquid to give an indication of the head for making a record of said oil-water proportion and draining the oil-water mixture from the tank, and repeating said cycle for successive tank fillings of oil-water mixtures whereby the amount of oil that is delivered from the tank may be determined.

10. The method according to claim 9 wherein in said cycle of operation, the tube is disconnected from said tank during draining of the tank and a subsequent filling thereof so that the gauging liquid remains in the tube during draining and filling.

11. The method of gauging the proportion of oil and water in a tank which is filled repeatedly with a mixture of oil and water which may settle in the tank in layers of free oil, an emulsion of oil and water and free water comprising a cycle of operation including the sequential steps of filling the tank to a predetermined level with the mixture of oil and water to be gauged, connecting to the tank a vertically extending tube containing a volume of oil and water in separated layers, said connection providing fluid communication between the water in the bottom of the tube and the water in the lowest layer in the tank and between the oil in the top of the tube and the oil in the uppermost layer in the tank whereby the oil-water interface in the tube is indicative of the proportion of oil and water in the tank, sensing the position of the oil-water interface in said tube for making a record of said oil-water proportion, and draining the oil-water mixture from the tank, and repeating said cycle for successive tank fillings of oil-water mixtures whereby the amount of oil that is delivered from the tank may be determined.

12. The method according to claim 11 wherein in said cycle of operation, the tube is disconnected from said tank during draining of the tank and a subsequent filling thereof so that the gauging liquid remains in the tube during draining and filling.

13. The method according to claim 11 wherein said oil-water interface in the tube is sensed by a float constructed to be buoyant in water but not in oil whereby the float is positioned at the oil-water interface.

References Cited by the Examiner

UNITED STATES PATENTS

| | | | |
|---|---|---|---|
| 2,371,457 | 3/1945 | Mendius | 73—438 |
| 2,644,329 | 7/1953 | Redfield | 73—438 |
| 2,817,967 | 12/1957 | Meyers | 73—221 X |
| 2,911,828 | 11/1959 | Keating et al. | 73—309 X |

RICHARD C. QUEISSER, *Primary Examiner.*

DAVID SCHONBERG, *Examiner.*